Feb. 6, 1923.

W. C. WALKER.
GLASS POLISHING MACHINE
FILED APR. 24, 1922.

1,444,225.

2 SHEETS—SHEET 1.

WITNESS:
Ed Jr. Clark.
F. M. Roeder.

INVENTOR:
William C. Walker
BY
E. T. Silvius
ATTORNEY.

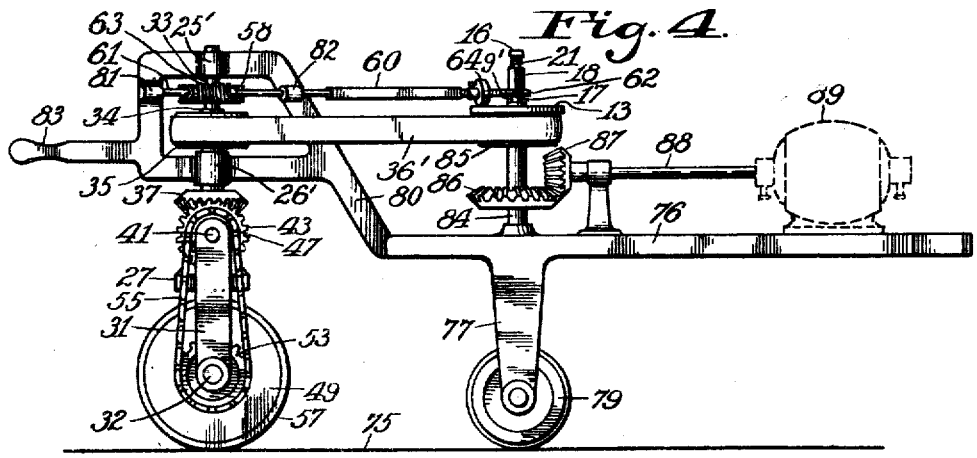
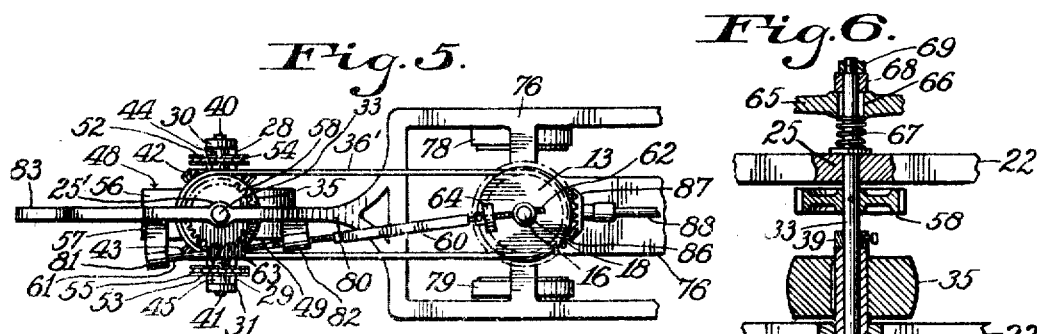
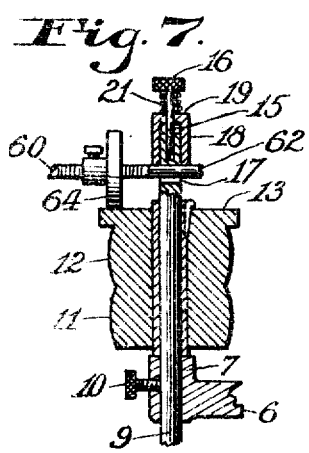
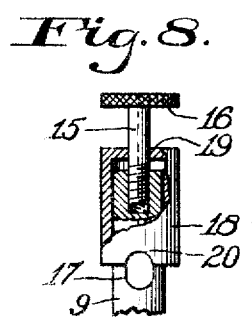
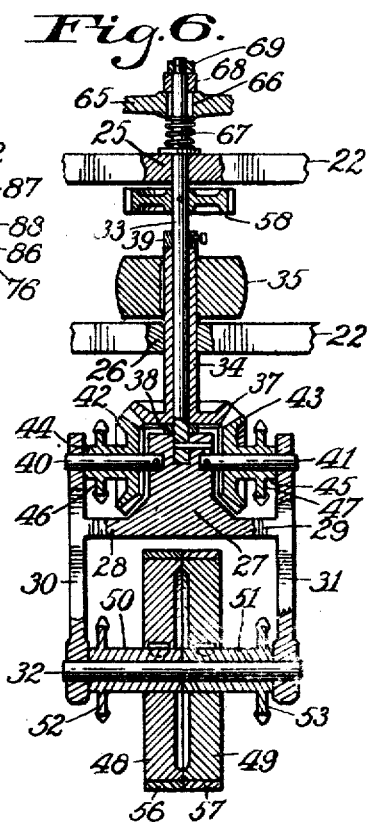

Patented Feb. 6, 1923.

1,444,225

UNITED STATES PATENT OFFICE.

WILLIAM C. WALKER, OF MONROE TOWNSHIP, MADISON COUNTY, INDIANA.

GLASS-POLISHING MACHINE.

Application filed April 24, 1920. Serial No. 376,193.

*To all whom it may concern:*

Be it known that I, WILLIAM C. WALKER, a citizen of the United States, residing in Monroe Township, in the county of Madison and State of Indiana, have invented a new and useful Glass-Polishing Machine, of which the following is a specification, reference being had to the accompanying drawings, and to the letters and figures of reference marked thereon.

This invention relates to a machine that is designed to operate on horizontal sheets or plates of glass to polish the surface thereof, the invention having reference more particularly to a glass-polishing machine that may have a permanent support for guiding it, or may have a portable support so that the machine may be readily moved from place to place as may be desired instead of moving the glass to the permanently supported machine.

An object of the invention is to provide a glass-polishing machine of such construction as to operate rapidly and efficiently in removing or eliminating scratches or other blemishes or defects from the surface of the sheet glass, especially plate glass, whether newly made or previously used glass sheets, for the purpose of restoring the original polished surface or correcting defective portions of the surface to correspond with the originally perfect surface.

Another object is to provide a glass-polishing machine head which shall be so constructed as to be adaptable either to be permanently arranged at a table or to be transferred from one to another table, and to be supported upon the sheet of glass on a table.

A further object is to provide an improved glass-polishing machine which shall be so constructed as to be capable of being readily controlled so as to operate with more or less force upon the glass, particularly so that the final finishing operations may be delicately performed to obtain the best results.

Figure 1:
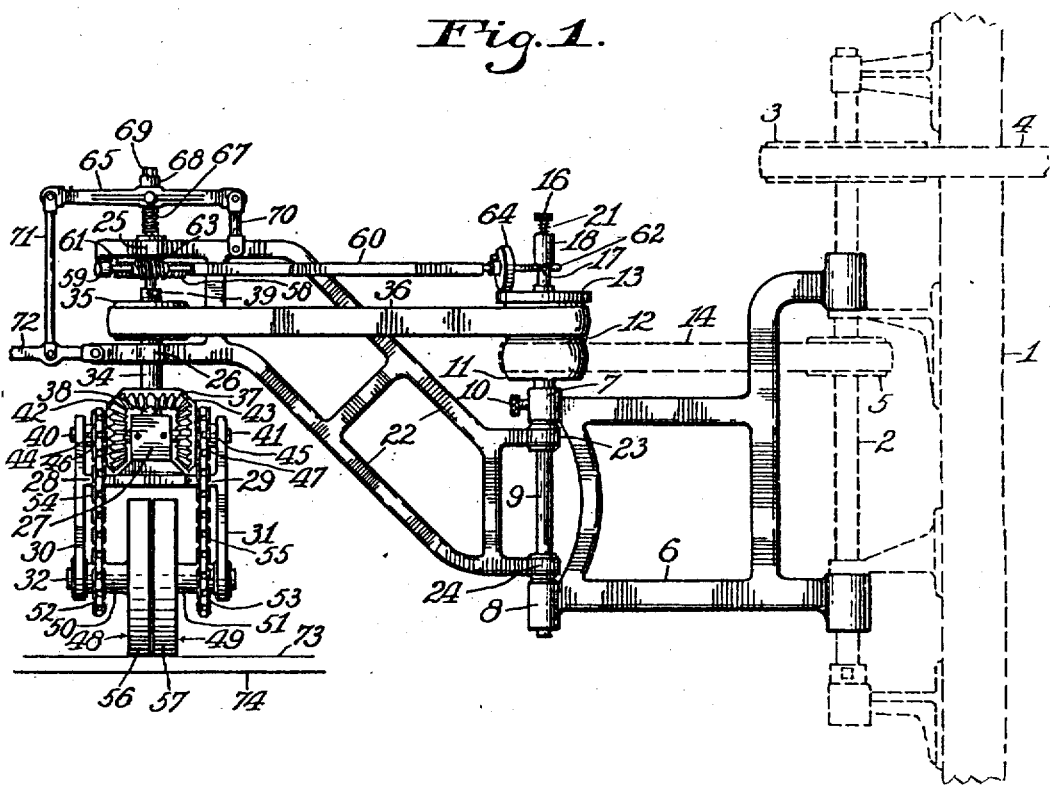
Figure 2:
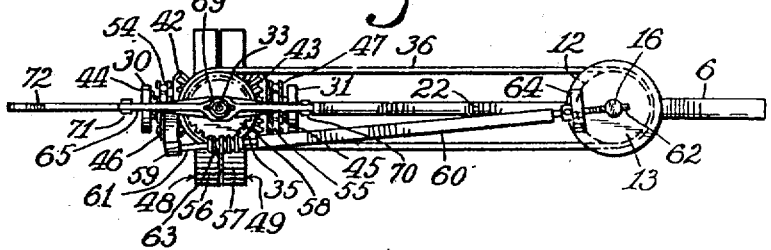
Figure 3:
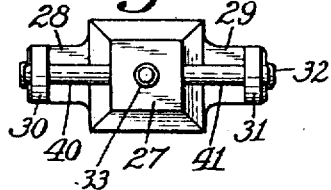

With the above-mentioned and other objects in view, the invention consists in a polishing head of novel construction and adapted to be variously guided and controlled, and further in the parts and combinations and arrangements of parts as hereinafter particularly described and finally defined in the appended claims.
Referring to the drawings,—Figure 1 is a side elevation of the glass-polishing machine permanently arranged; Fig. 2 is a top plan of the machine; Fig. 3 is a top plan of the polishing wheel frame; Fig. 4 is a side elevation of the glass-polishing machine slightly modified so as to be portable; Fig. 5 is a top plan of Fig. 4; a portion thereof being broken away; Fig. 6 is a vertical central section of the polishing head as preferably constructed; Fig. 7 is a vertical central section showing associated parts of the machine in detail; and, Fig. 8 is a fragmentary sectional elevation showing a portion of the preceding figure in detail on an enlarged scale.

Similar reference characters in the different figures of the drawings indicate corresponding elements or features of construction herein referred to in detail.

When it is desired that the polishing machine be permanently arranged a suitable upright support 1 is selected or provided and on which a vertical shaft 2 is suitably supported rotatably and provided with a pulley 3 to be driven by a belt 4, the shaft having also a pulley 5 thereon, all of which may be of various construction as to details.

The polishing head is provided with a suitable jointed frame which comprises an open-work main part 6 connected to the shaft 2 so as to swing thereon and permit the shaft to rotate, the main part having shaft boxes 7 and 8 arranged one above another and vertically supporting a shaft 9 which is secured against rotation by a set-screw 10 or otherwise. Two pulleys 11 and 12 are connected together, integrally or otherwise and are rotatably arranged on the shaft 9. The uppermost pulley 12 has a driving disk 13 on its top. The pulley 11 is to be driven by means of a belt 14 connected therewith and the pulley 5. An adjusting screw 15 is arranged in the upper portion of the shaft 9 and has a head 16 thereon. The shaft has a slot 17 at a suitable distance below its upper end, the slot extending vertically and constituting a journal bearing. A sleeve 18 is arranged to slide vertically over the upper portion of the shaft and has a head 19 that receives the adjusting screw, the lower portion of the sleeve being adapted to rest upon a journal, being preferably provided with a concavity 20 to receive the uppermost portion of the journal. A spring 21 is arranged upon the head 19 and is under compression against the head 16 to yieldingly force the sleeve downward. A goose-neck arm 22 is provided with journal boxes 23 and 24 which are connected with the shaft 9 so as to turn thereon and thereby be hinged to the main part 6, the arm extending upwardly from the main part, and near its end portions is provided with journal boxes 25 and 26 to constitute portions of the polishing head.

The polishing head which is an important feature of the invention includes a wheel frame comprising a main portion 27 having lateral arms 28 and 29 on the ends of which are side bars 30 and 31 extending upwards and downwards from the arms, the lower portions of the side bars having an axle 32 connected thereto. A spindle 33 is vertically arranged and secured rigidly to the main portion of the wheel frame and a sleeve or long hub 34 is rotatably arranged on the spindle and has a pulley 35 secured thereto, the sleeve being rotatably arranged in the journal box 26 and guiding the spindle. A belt 36 is connected with the pulley 35 and also with the pulley 12 to rotate the sleeve or hub. The spindle extends upward through and is rotatably guided in the journal box 25. The lower portion of the sleeve or hub has a bevel gear wheel 37 fixed thereon and the under side thereof preferably is provided with a suitable bearing collar 38 supported upon the main portion 27. Preferably the spindle 33 has a collar 39 secured thereto at the top of the sleeve 34. Two shafts 40 and 41 are arranged in the upper portions of the side bars 30 and 31 respectively, and secured to the main portion 27, and they support bevel gear wheels 42 and 43 respectively, that are in mesh with opposite portions of the wheel 37, to be rotated by the latter in opposite directions. The wheels 42 and 43 have extended hubs 44 and 45 respectively, on which sprocket wheels 46 and 47 are fixed, respectively. Two polishing wheels 48 and 49 have hubs 50 and 51 fixed thereon respectively that are mounted on the axle 32, the hubs having sprocket wheels 52 and 53 fixed thereon respectively. A sprocket chain 54 is connected with the wheels 46 and 52 and a similar sprocket chain 55 is connected with the wheels 47 and 53, so that the polishing wheels shall be driven in opposite directions. The polishing wheels are arranged as close together as may be practicable and have suitable buffer bands 56 and 57 thereon.

A gear wheel 58 is secured to the spindle 33 for slowly turning the wheel frame in operation. The portion of the goose-neck arm that has the journal box 25 is provided with a shaft bearing 59, and a shaft 60 is horizontally arranged and has a journal portion 61 rotatably arranged in the box 59 and has also another journal portion 62 arranged in the shaft bearing 17 of the vertical shaft 9. The shaft 60 has a worm 63 fixed thereon in engagement with the wheel 58, and a driving disk 64 is arranged on the shaft 60 and adjustably secured thereto so as to be in contact with the driving disk 13 whereby to rotate the shaft at different speeds, the disk 64 being movable towards or from the axis of rotation of the disk 13.

Provision is made for enabling the operator to vary the pressure of the polishing wheels on the glass or to lift the wheels from the glass, and in the preferred form of construction comprises a lever 65 which has a slot 66 between its ends receiving the upper portion of the spindle 33, a coil spring 67 arranged on the spindle and suitably seated on the journal box 25 and the under side of the lever to force the polishing wheel frame upward, a bearing collar 68 arranged upon the lever, a nut 69 secured to the spindle in contact with the collar, a link 70 pivoted to the arm 22 and pivotally connected with one end of the lever 65, a link 71 pivoted to the opposite end of the lever 65, and a controlling lever 72 connected to the link 71 and pivoted to the arm 22 adjacent to the journal box 26. The permanently arranged apparatus may swing over a sheet of glass represented by the line 73 arranged upon a table 74, so that the polishing wheels may be readily shifted from one place to another upon the glass as may be required.

When it is desired that the polishing machine shall be portable and be supported upon the glass sheet represented by the line 75 the machine is provided with a suitable platform 76 having legs 77 which are provided with rubber tired wheels 78 and 79, and one end of the platform has a gooseneck arm 80 extending upwardly and provided with journal boxes 25' and 26' in which the spindle 33 and the long hub 44 are rotatably mounted, the hub or sleeve 34 having the pulley 35 secured thereto. The polishing head including the polishing wheel frame, the polishing wheels and the gearing may be constructed and arranged as above described. The arm 80 has a bearing box 81 and preferably a similar box 82 supporting the shaft 60 having the worm 63 in engagement with the gear wheel 58, and the arm has also a controlling arm 83 rigid thereon to enable the operator to move and control the machine. A hollow shaft 84 is rotatable on a vertical shaft 9' supported vertically on the platform and has a pulley 85 secured thereto which has the friction drive disk 13 on its top to rotate the disk 64, the shaft 60 having the journal portion 62 arranged in the slot 17 with which the shaft 9' is provided, the upper portion of the shaft being equipped similarly to the upper portion of the shaft 9. The hollow shaft 84 has a bevel gear wheel 86 fixed thereto which is engaged by a pinion 87 secured to a horizontal shaft 88 of a suitable electric motor 89 supported on the platform 76. A belt 36' is connected with the pulley 85 and a pulley 35.

In the operation of the permanently arranged polishing machine the operator swings the supporting arm by means of the lever 72 and may lower the polishing wheels to the glass plate by pressing downward on the controlling lever. Suitable polishing substance is placed upon the glass surface and worked by the polishing wheels which as will be understood, are rotated in opposite directions while the polishing wheel frame is continuously rotated, so that while the polishing wheels are moved about upon the glass surface all the scratched or defective portions of the surface may be quickly polished, the rubbing contact being in all directions under control of the operator. In the operation of the portable machine the weight of the polishing wheel head and connections is partly counterbalanced by the motor on the opposite portion of the platform, so that the operator by means of the lever arm 83, may readily lift the polishing wheels from the glass or may force the wheels to the glass, and while the wheel frame is mechanically rotated the operator may roll the machine about from place to place upon the glass plate, or swing the machine about while the wheel frame is rotated and the polishing wheels are operating on the glass.

Having thus described the invention, what is claimed as new is—

1. A machine for re-polishing glass plates, including a frame arm movably supported, a guide shaft mounted on the arm, a hollow hub rotatably mounted in the arm, a bevel gear wheel and a pulley fixed to the hub, a driving pulley on the guide shaft, a belt connected with the two pulleys, a wheel frame, a spindle rigidly secured to the wheel frame and rotatably guided in the hollow hub and also separately in the frame arm, gearing connected with the driving pulley and the spindle to continuously rotate the spindle, two polishing wheels arranged closely together side by side and rotatably mounted approximately in contact each with the other in the wheel frame, and gearings to rotate the polishing wheels respectively connected with the bevel gear wheel.

2. In a glass-polishing machine, the combination with a goose-neck arm having a journal box, of an upright wheel frame provided with an axle adjacent to the lower end thereof, two polishing wheels arranged closely together and rotatable on the axle, a driving gear wheel arranged at the upper end of the wheel frame and having a sleeve hub thereon that extends rotatably through the journal box, a pulley secured to the sleeve hub above the journal box for rotating the hub, a driving pulley, a belt connected with the two pulleys, a stem secured to the wheel frame adjacent to the upper end thereof and extending through the sleeve hub, two gear wheels rotatably supported on the upper portion of the wheel frame in mesh with the driving gear wheel, and motion-transmitting means connected with the two gear wheels and the polishing wheels respectively to rotate the polishing wheels.

3. In a glass-polishing machine, the combination of a wheel frame comprising a central main portion and two arms on opposite sides of the main portion and also two side bars on the arms respectively, the side bars being connected between their ends to the arms, two bevel gear wheels rotatably supported by said central main portion on opposite sides respectively thereof and by said bars respectively adjacent to one end thereof, two sprocket wheels fixed on the bevel gear wheels respectively, an axle connected to said side bars adjacent to the opposite ends thereof, two polishing wheels arranged closely together and rotatably mounted in approximate contact each with the other on the axle, two sprocket wheels fixed on the polishing wheels respectively, a sprocket chain connected with the sprocket wheel that is on one of the bevel gear wheels and also with the sprocket wheel on one of the polishing wheels, a sprocket chain connected with the sprocket wheel on the remaining one of the bevel gear wheels and also with the sprocket wheel on the remaining one of the polishing wheels, a spindle secured to said central main portion, and a bevel driving gear wheel rotatable on the spindle and engaging the two bevel gear wheels.

4. In a glass-polishing machine, the combination with a movable guiding frame having two journal boxes adjacent to one end thereof and arranged one above the other, a shaft non-rotatably supported vertically by the guiding frame at a distance from the journal boxes and having a journal bearing adjacent to its upper end, a driving pulley rotatable on the shaft and having a friction-drive disk on its top, and means to rotate the driving pulley, of a sleeve hub rotatably arranged in the lower one of the two journal boxes and having a driving gear wheel fixed on the lower portion thereof, a pulley secured to the upper portion of the sleeve hub, a belt connected with said pulleys, a wheel frame having a main portion arranged under the driving gear wheel, a spindle secured to said main portion and extending rotatably through said hub and into the upper one of said journal boxes, a polishing wheel rotatable in the wheel frame, motion-transmitting means connected with the driving gear wheel and the polishing wheel, a worm-gear wheel secured to said spindle above said hub, a horizontal shaft rotatably supported by the guiding frame and said journal bearing and having a worm fixed thereon in engagement with said worm-gear wheel, and a disk adjustably secured to the horizontal shaft in contact with said friction-drive disk.

5. In a glass-polishing machine, the combination with a guiding frame having two journal boxes arranged one above the other, of a sleeve hub rotatably arranged in the lower one of the journal boxes, a driving wheel fixed to the lower portion of the sleeve hub, a wheel frame arranged beneath the driving wheel, a spindle secured to the wheel frame and extending movably through the sleeve hub and the upper one of the two journal boxes, a polishing wheel rotatably arranged in the wheel frame, motion-transmission means connecting the polishing wheel with the driving wheel, a coil spring arranged on the spindle and supported upon the upper one of the journal boxes, a link connected to the guiding frame adjacent to the upper one of the journal boxes, a controlling lever pivotally connected at one end with the link and having an aperture between its ends receiving the spindle, the lever being supported upon the spring, a lifting device connected to the spindle to be engaged by the lever, an operating lever pivoted at one end to the guiding frame adjacent to the lower one of the two journal boxes, a link connected with the operating lever and also with the controlling lever adjacent to the opposite end thereof, and a device secured to the sleeve hub to rotate the hub.

6. In a glass-polishing machine, the combination with a guiding frame having a journal box adjacent to one end thereof, of a guide shaft fixedly supported by the guiding frame and having a journal bearing therein, a pulley rotatably arranged on the guide shaft and having a friction-drive disk thereon, a wheel frame arranged below the journal box, a driving gear wheel arranged upon the wheel frame and having a sleeve hub rotatably arranged in the journal box, means to rotate the sleeve hub, a spindle secured to the wheel frame and extending rotatably through the sleeve hub, a polishing wheel rotatable in the wheel frame, transmission gearing connecting the polishing wheel with the driving gear wheel, a horizontal shaft rotatably supported on the guiding frame and in said journal bearing, gears connecting the horizontal shaft with the spindle, a disk adjustably secured to the horizontal shaft in contact with the friction-drive disk, a sleeve movable on the upper portion of the guide shaft and having a bearing cavity receiving a portion of the horizontal shaft, the sleeve having a head therein, an adjusting screw extending through the head in said sleeve and into the top of the guide shaft and having a head thereon, and a coil spring on the adjusting screw and seated against said heads.

In testimony whereof, I affix my signature in presence of two witnesses.

WILLIAM C. WALKER.

Witnesses:
 JACOB J. LONG,
 WILLIAM T. BAKER.